US006961934B2

(12) United States Patent
Alford et al.

(10) Patent No.: US 6,961,934 B2
(45) Date of Patent: Nov. 1, 2005

(54) PORTABLE THREAD ENVIRONMENT

(75) Inventors: George C. Alford, San Diego, CA (US); Hock Law, Carlsbad, CA (US); Suresh S. Kumar, San Diego, CA (US)

(73) Assignee: Microtune (San Diego), Inc., San Diego, CA (US)

( * ) Notice: Subject to any disclaimer, the term of this patent is extended or adjusted under 35 U.S.C. 154(b) by 804 days.

(21) Appl. No.: 09/792,550

(22) Filed: Feb. 23, 2001

(65) Prior Publication Data

US 2002/0120665 A1 Aug. 29, 2002

Related U.S. Application Data

(60) Provisional application No. 60/203,178, filed on May 8, 2000.

(51) Int. Cl.[7] .................................................. G06F 9/46
(52) U.S. Cl. ...................... 718/100; 718/103; 719/314
(58) Field of Search ................................ 718/100, 102, 718/103, 104, 106, 107, 101, 105; 719/314; 370/412; 712/1; 707/10

(56) References Cited

U.S. PATENT DOCUMENTS

| | | | | |
|---|---|---|---|---|
| 5,421,013 A | * | 5/1995 | Smith ........................ | 718/107 |
| 5,452,456 A | | 9/1995 | Mourey et al. | |
| 5,745,778 A | * | 4/1998 | Alfieri .......................... | 712/1 |
| 6,012,081 A | * | 1/2000 | Dorn et al. ................. | 718/102 |
| 6,115,710 A | * | 9/2000 | White ......................... | 707/10 |
| 6,298,370 B1 | * | 10/2001 | Tang et al. ................. | 718/102 |
| 6,507,861 B1 | * | 1/2003 | Nelson et al. ............. | 718/104 |
| 6,694,381 B1 | * | 2/2004 | Lo et al. ....................... | 710/5 |

FOREIGN PATENT DOCUMENTS

EP  0 813 147 A2  12/1997

OTHER PUBLICATIONS

PCT Search Report PCT/US01/14934 dated Jun. 8, 2002.
Kernel FP Software Completion; "If you Dont Know What to do Here, Say n."; http://math–www.uni–paderborn.de/˜axel/contiguire; 1 pg.; XP–002198216; no date given.
Webpage http://math–www.uni–paderborn.de/˜axel/contiguire; no date given; XP–002198217.
David A. Rusling; "The Linus Kernel"; Review Version 8.0–3; Copy right (c) 1996–1999; Jan. 25, 1999; XP–002181812.
Xavier Leroy; "Linux Threads Frequently Asked Questions (with answers)"; Oct. 26, 1999; pp. 1–18; XP–002138174.
Bob Hillard, Adam Di Carlo; "Release Notes for Debain GNU/Linux 2.1 (Slink)—Chapter 1: What's New in Debain GNU/Linux 2.1"; Aug. 28, 1999; 1 pg; XP–002181813.
Screenshot; XP–002181814; no date given.
Petri Makijavi; European Synchrotron Radiation Facility; Porting OS–9/68k Software on OS–9–x86/PowerPC; Mar. 5, 2002; XP–002198215.
Open Source Developemnt Network Newsletters; "Project: Cochs x86 emulator"; XP–002181816; no date given.
Michel De Champlain; "A Pattern Language for Porting Micro–Kernels"; Proceedings of IWOOOS; 1996 pp. 144–150.
D. Abramson; "Predicting the Performance of Science Applications on Distributed Memory Multiprocessors"; IEEE 0–8186–5680–8/94; 1994; pp. 285–292.
Brian Ward; "Le Howto du Noyau Linux (Kernel HOWTO)"; Jun. 1999; XP–002198218; (No translation provided).

* cited by examiner

*Primary Examiner*—Majid Banankhah
(74) *Attorney, Agent, or Firm*—Baker Botts L.L.P.

(57) ABSTRACT

A portable thread environment comprising: an application programming interface configured to support multiple application program tasks with each task comprised of one or more threads; host adaptation logic for communicatively interfacing the tasks and threads with a host processing environment; and a scheduler configured to determine an execution order of the one or more threads based on one or more execution variables.

21 Claims, 15 Drawing Sheets

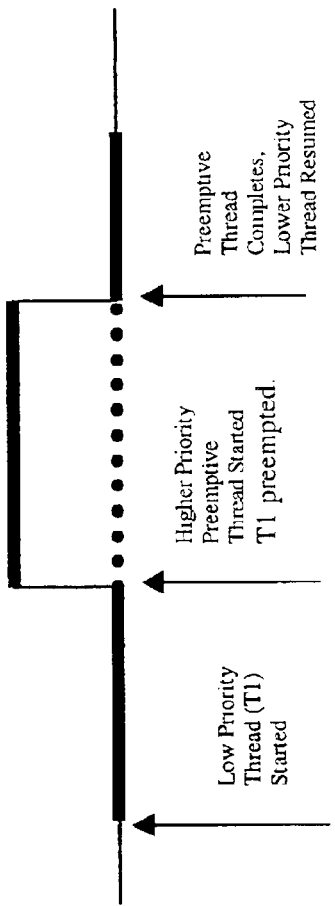
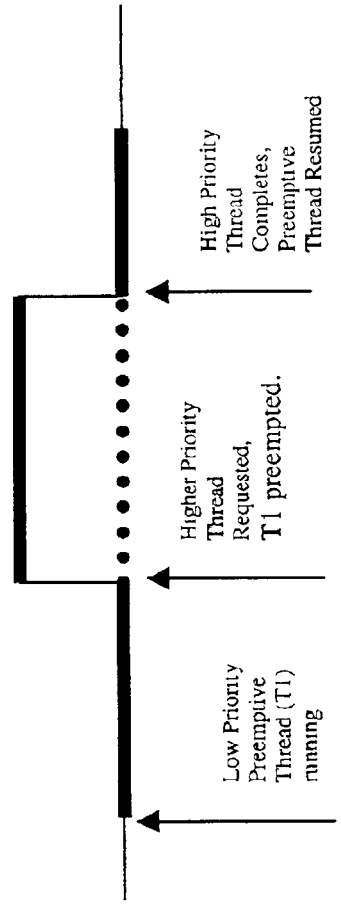
FIG. 8a
FIG. 8b

| Thread Attribute Table | |
|---|---|
| Thread[n] | Task ID |
| | Thread ID |
| | Thread Priority {0-MaxPriority} |
| | Task Type {preemptive\|cooperative} |

FIG 13a

| Task Status Table | |
|---|---|
| Task[m] | Status |
| 0 | Status {Idle\|0...MaxPriority} |
| 1 | " |
| " | " |
| M | " |

FIG 13b

| Preempted Task Table | |
|---|---|
| Priority Level | Status |
| 0 | Status {Idle\|In-use} |
| 1 | " |
| " | " |
| Max-Priority | " |

FIG 13c

PORTABLE THREAD ENVIRONMENT

This application claims the benefit of U.S. Provisional Application No. 60/203,178, filed May 8, 2000.

BACKGROUND OF THE INVENTION

1. Field of the Invention

This invention relates generally to the field for software design; and, more particularly, to an application environment for supporting portable, embedded, concurrent, and/or real-time applications.

2. Description of the Related Art

The term "application" is commonly used to refer to the objective or problem for which the software, or "application program," is a solution. The form of the solution—the application program—is dependent, in part, on the configuration of the hardware on which the software is executed and, in part, on the other programs that may be executing in concert with the application program.

An application program is typically translated from an instruction set derived from one of several well-known programming languages to an instruction set closely reflecting the capabilities of processor executing the application program. This translation is accomplished by programs generally know as "compilers," "assemblers" or "interpreters." These programs translate the application program's original instructions to a set of instruction typically know as "machine code" for which there is a one-to-one correspondence between machine code instructions and the unitary operations the machine (or processor) is able to perform. Typically, machine code instructions are dependent on the machine's central processing unit (or CPU). The operation of these and similar programs are well known to those of ordinary skill in the art.

Application programs are frequently executed simultaneously with other application programs, sharing (and sometimes competing for) the resources of the host hardware.

Application programs must also frequently share the resources of the host hardware with "interrupts service routines" (ISR). These ISRs are typically short program segments that interrupt the normal program instruction sequence and execute, substantially immediately, in response to a hardware signal (an "interrupt") to the CPU.

Application programs may be invoked by, or may invoke, the services of other sets of programs running on the host that are collectively know as an "operating system." Operating system programs are typically responsible for controlling the allocation of the host's resources, including access to the host machine's data stores, central processing unit, and input/output devices. One aspect of controlling the allocation of a host's resources typically involves insuring that no two applications, ISRs, or portions of the same application try to control a resource at the same time. A number of techniques for preventing this are well know in the art, including semaphores, counting semaphores, mutexes, signals, and critical sections. A critical section is a portion of a program that, once started, is uninterruptible and executes continuously without allowing other programs to run until the critical section has ended.

Application software is executed within some "host environment," defined collectively by the host machine's hardware (including, possibly, application-specific support hardware such as an application-specific integrated circuit or "ASIC") and operating system.

Commonly, commercial application software vendors are required to adapt, or "port," their application programs to run in a multiple heterogeneous host environments. These environments may differ in their CPU's, choice of operating systems, and application-specific hardware. In order to port an application program from one host environment to another, it is typically necessary to account for any or all of these differences.

The tradition approach to porting applications is to write the application program in a "high-level language" that hopefully can be recompiled to generate machine code that can run within any of the prospective processors. While this "traditional approach" solves the portability problem at the machine code level, it is only partly addresses the application portability problem. It is also necessary to account for differences in the host environment's operating system and application-specific support hardware. For example, each operating system defines a unique application programming interface ("API") which application programs use to access the operating systems services. Because these APIs are unique, portions of the application program having access to the operating system's API must be rewritten when the application program is ported to a new operating system. In addition, accounting differences in application-specific support hardware (circuits that are able to perform a portions of the application's function that otherwise have to be performed in software) also may require that some portion of the application software be rewritten.

A problem with the traditional porting method is that this method requires that at least some portion of the application program be rewritten. This is a potentially costly and error-prone process. Because there is a likelihood of introducing unintentional errors whenever the application program is altered, this method mandates that the application developer bare the additional expense of re-testing the application after the indicated changes are complete.

More significantly, and despite the availability of a number of commercially operating systems, most embedded applications are deployed today are in host environments that supply no operating system services. Thus, for application portability, a means must be provided to ensure application software can operate correctly isolated from the vagaries of its host environment.

SUMMARY OF THE INVENTION

A portable thread environment comprising: an application programming interface configured to support multiple application program tasks with each task comprised of one or more threads; host adaptation logic for communicatively interfacing the tasks and threads with a host processing environment; and a scheduler configured to determine an execution order of the one or more threads.

BRIEF DESCRIPTION OF THE DRAWINGS

A better understanding of the present invention can be obtained from the following detailed description in conjunction with the following drawings, in which:

FIGS. 8a–d illustrates various examples of coordination between preemptive tasks and cooperative tasks.

FIGS. 13a illustrates a thread attribute table according to one embodiment of the invention.

FIGS. 13b illustrates a task status table according to one embodiment of the invention.

FIGS. 13c illustrates a preempted task table according to one embodiment of the invention.

DETAILED DESCRIPTION

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the invention.

Embodiments of the invention described below seek to avoid the problems associated with porting application software by creating a portable environment in which an application can be moved from one host environment to another unchanged.

Embodiments of the Invention

PTE Overview

Figure 1:
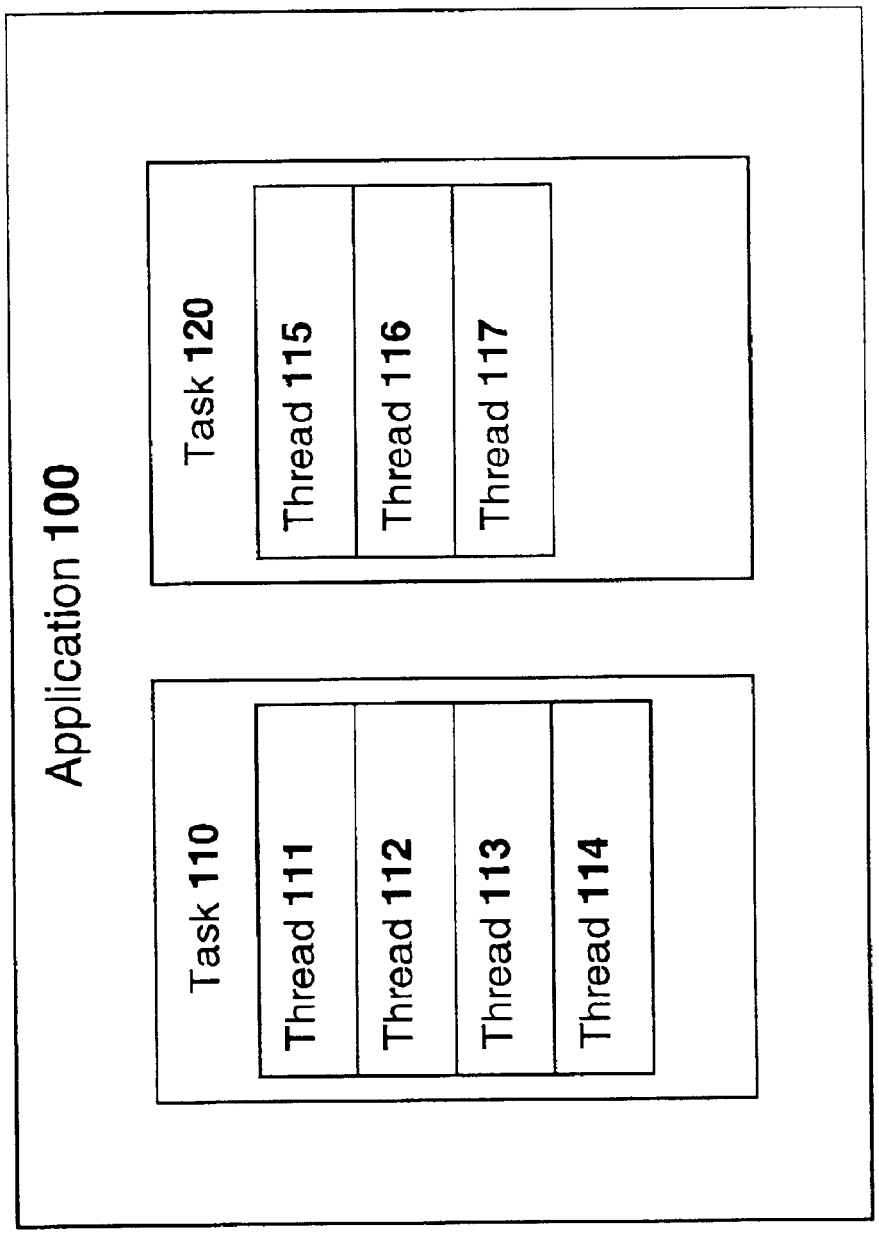
FIG. 1 illustrates an application having two tasks, one task comprised of four threads and the other task comprised of three threads.

As illustrated in FIG. 1, in one embodiment, an application 100 is constructed as a series of short, sequentially executed program fragments, referred to herein as "threads" 111–117. Each thread 111–117 is assigned to a logical grouping called a "task" 110, 120. For example, in FIG. 1, threads 111–114 are grouped within task 110 and threads 115–117 are grouped within task 120. In general, tasks may be used to partition an application into one or more sub-units, each accomplishing a specific function. An application may be subdivided into any number of tasks and each task may contain any number of threads.

Figure 2:
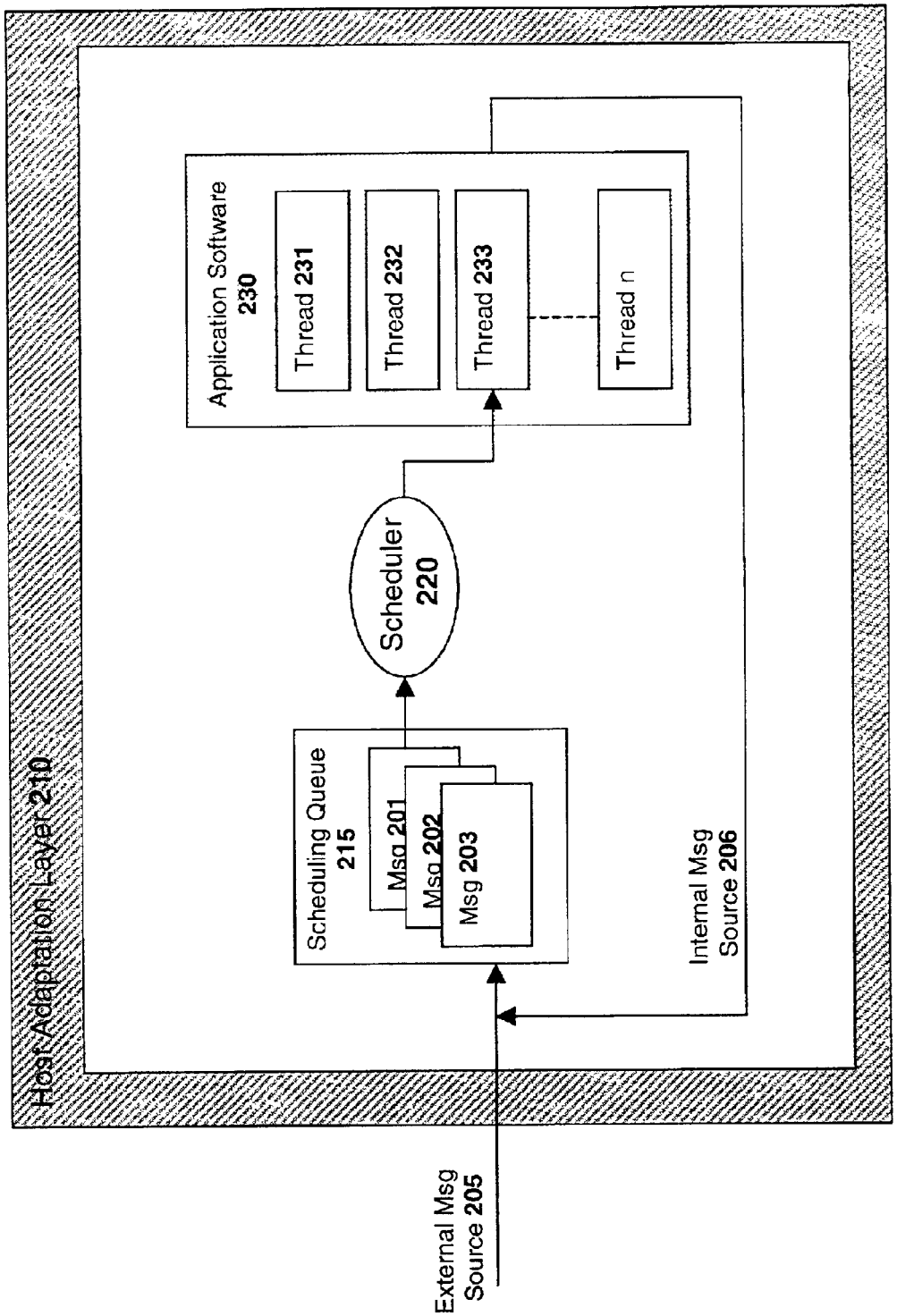
FIG. 2 illustrates message flow between a scheduling queue, a scheduler, and various threads according to one embodiment of the invention.

As illustrated in FIG. 2, one embodiment of the invention includes a Portable Thread Environment ("PTE") which is comprised generally of a scheduler 220, one or more scheduling queues 215, and a host adaptation layer 210.

The scheduling queue 215 accepts messages from executing threads (e.g., internal message source 206) and/or from sources external to the PTE (e.g., external message source 205). Each PTE-supported message is tagged with a code (e.g., a value or name) uniquely identifying a thread to which that message is to be delivered.

In one embodiment, threads are executed by the PTE scheduler 220 in a sequence determined by scheduling variables such as, for example, the message order in the PTE scheduling queue 215, and/or the priority of messages stored in the queue 215. The scheduling queue 215 in one embodiment is a list formed as messages are received from internal sources 206 such as running threads and from external sources 205 with which the application interacts. One example of an external message source is application-specific support hardware found the host environment.

Threads which are members of the same task may share information through common memory stores or by passing messages between themselves. By contrast, in one embodiment, threads which are members of different tasks may exchanges data only by sending messages.

The task grouping is designed (in part) to support the use of application-specific support hardware in an application's design. When an application is designed, the functions which are to be supported by application-specific hardware are modeled in the form of one or more tasks. When the application-specific circuits are subsequently incorporated into the design, the tasks are removed from the application software 230 (i.e., they are provided by the application-specific circuit).

The host adaptation layer 210 in one embodiment ensures that messaging between threads in different tasks is identical to the messaging between threads and an application's support hardware. In other words, the application programming interface ("API") used by the application is consistent, regardless of whether application-specific circuits are involved. The inclusion of an application-specific circuit, therefore, does not require modifications to the underlying application code (in one embodiment only an small amount of code in the host adaptation layer 210 is modified). As such, in this embodiment the application is effectively shielded from the host environment.

Figure 3:
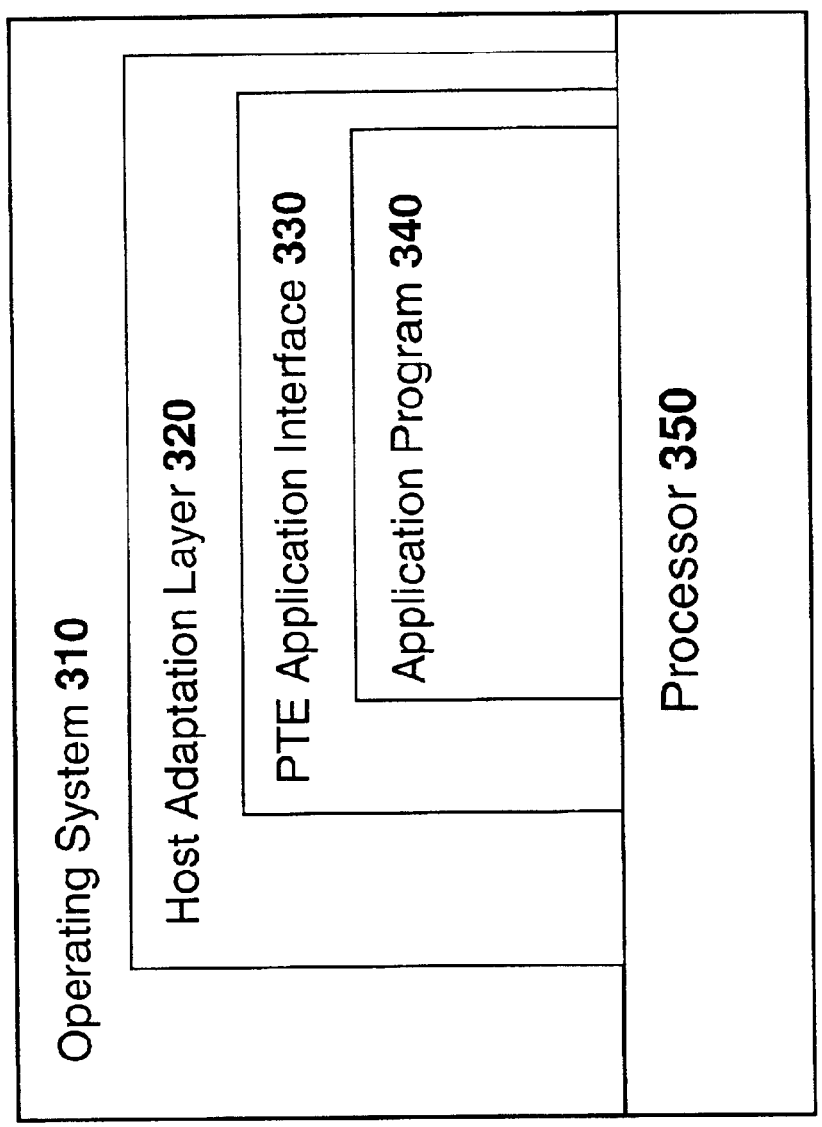
FIG. 3 illustrates one embodiment of a portable thread environment (a PTE application interface and a host environment interface layer) and its relationship to an application program and a host environment including an operating system.

As illustrated in FIG. 3, in one embodiment, all interactions between the application program 340 and the host's operating system 310 occur through the PTE application interface 330 and the host adaptation layer 320. When the host environment includes operating system services, the PTE is scheduled and executed as an operating system task with the PTE's application program(s) 340 contained therein. In other words, the application program(s) 340 and the operation system 310 are isolated from one-another by the host adaptation layer 320 and the PTE interface 330.

Figure 4:
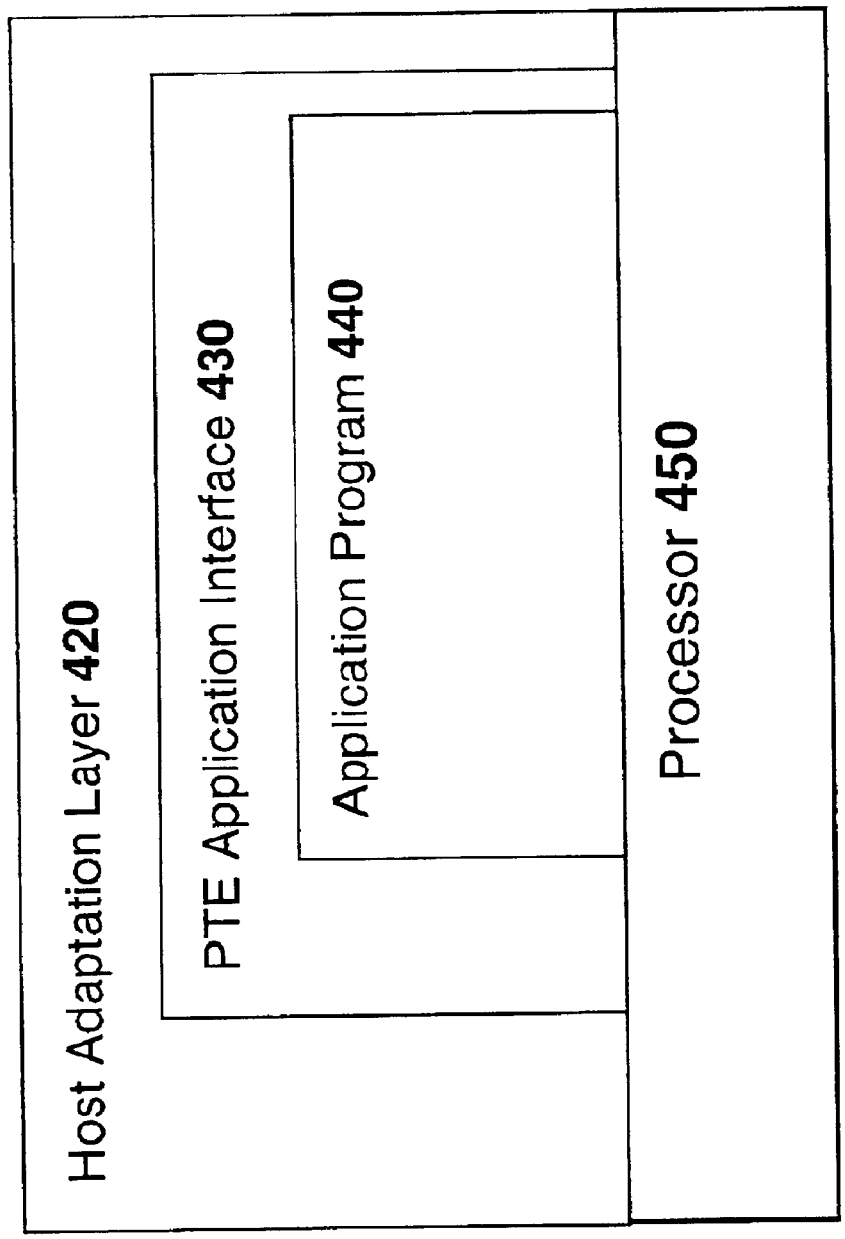
FIG. 4 illustrates an embodiment of a portable thread environment implemented without an embedded operating system.

The majority of embedded applications, however, are implemented without the aid of an embedded operating system. For host environments without operating system support, the PTE and application can run in a stand-alone configuration as depicted in FIG. 4. When running stand-alone, the host adaptation layer 420 supplies any necessary hardware support (i.e., interfaces) and communicates to the internal application threads through the PTE messaging system.

Figure 5:
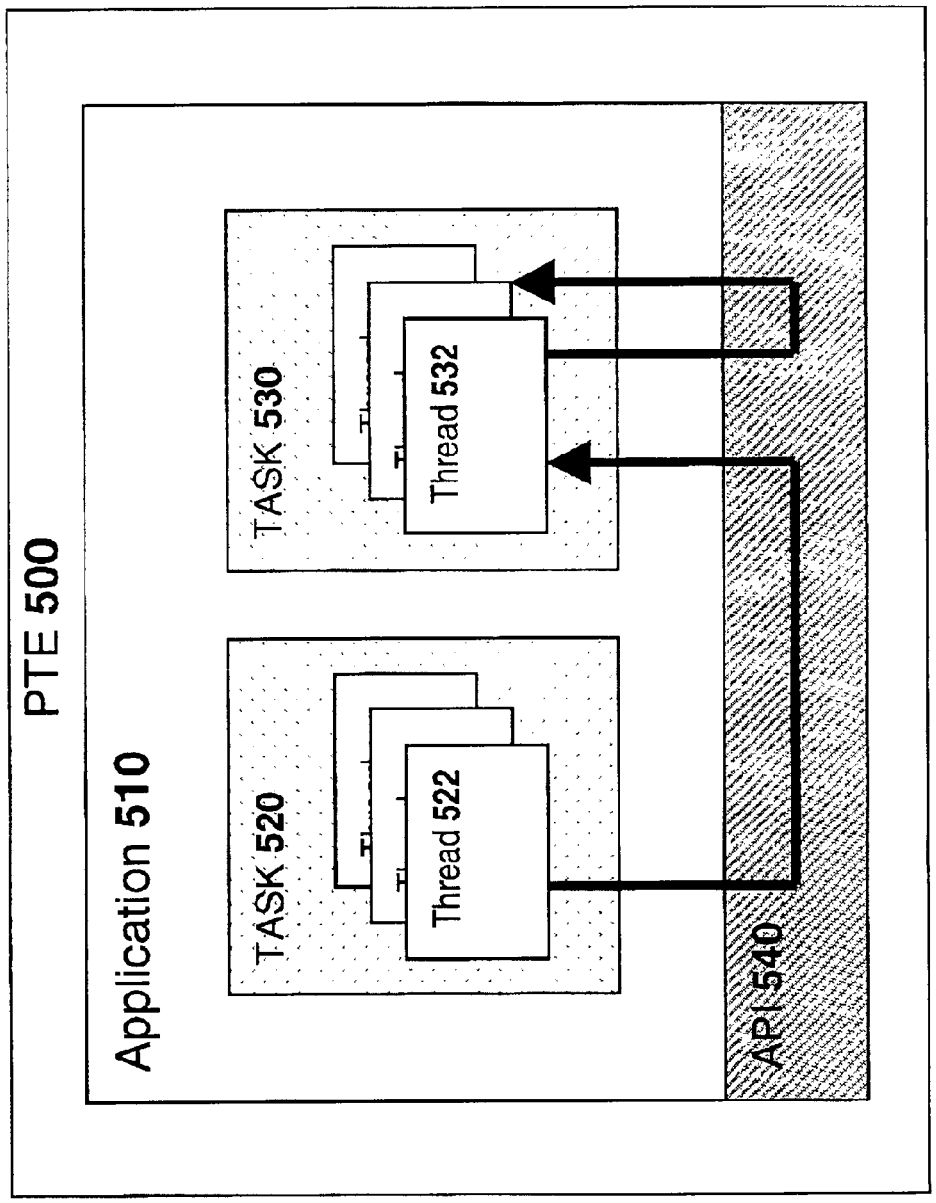
FIG. 5 illustrates two tasks communicating through a portable thread application programming interface.

FIG. 5 illustrates message transport between tasks/threads according to one embodiment of the invention in greater detail. Task 520 in this embodiment communicates with task 530 by a message exchange between thread 522 and 532, respectively. As indicated, the inter-thread message passing is accomplished via the portable thread environment API 540. Similarly, as indicated in FIG. 5, threads within the same task 530 may also communicate (e.g., pass messages) through the API 540.

Figure 6:
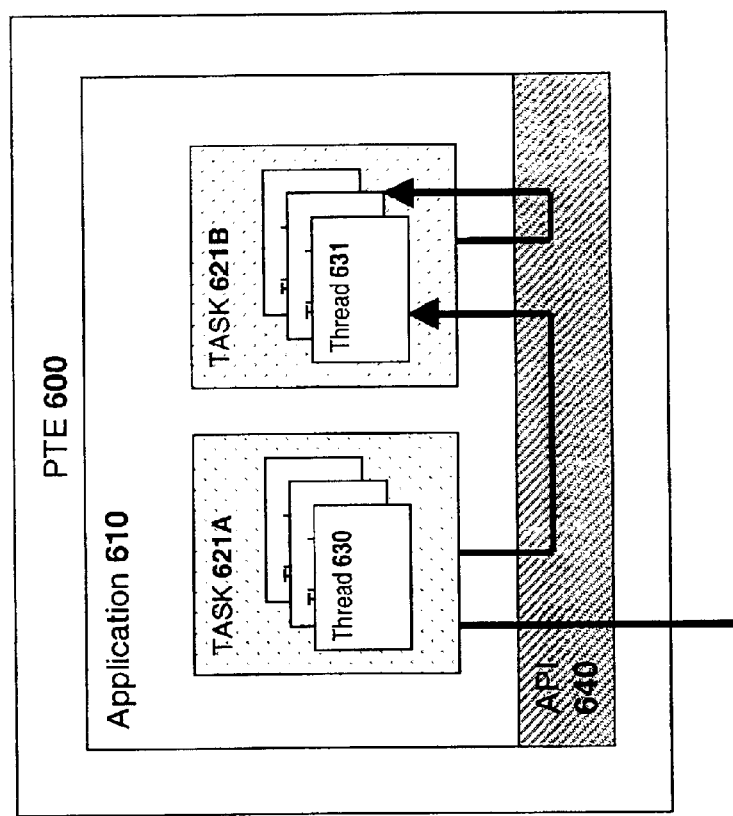
FIG. 6 illustrates two tasks residing in separate portable thread environments and communicating through an application programming interface.
Figure 6:
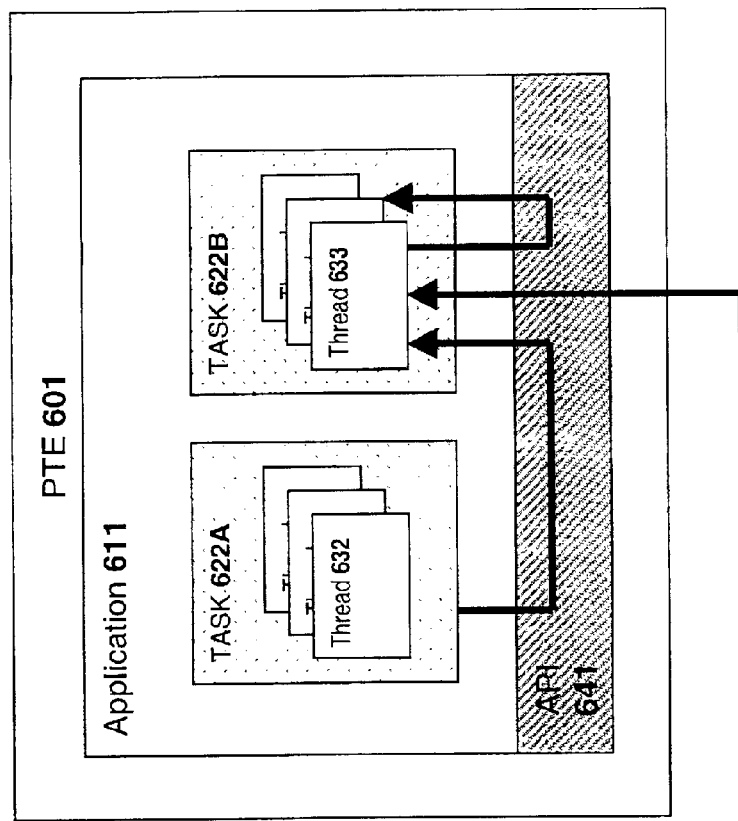

As illustrated in FIG. 6, the application framework of one embodiment allows applications 610, 611 to be distributed across multiple PTEs 600 and 601, respectively. This embodiment may be particularly suited for multi-processor configurations (e.g., where each PTE 600, 601 is configured for a different processor). In one embodiment, a common API is used for both inter-PTE and intra-PTE messaging. The common API allows an application to be configured to run in either a multiprocessor environment or on a single processor by merely altering a single routing configuration file (i.e., no changes to the application are required).

Task Types and Scheduling

Figure 7:
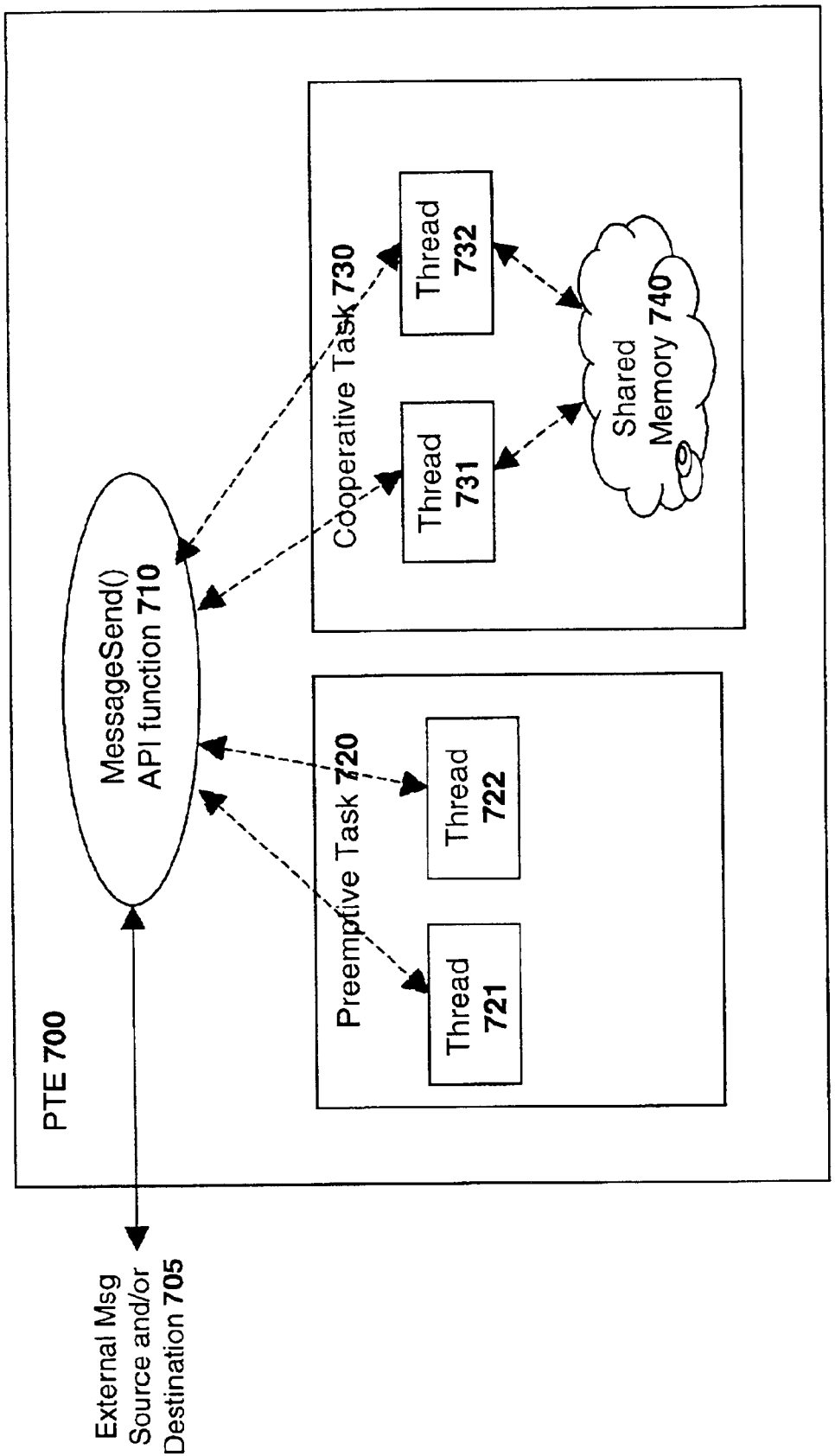
FIG. 7 illustrates a preemptive task and a cooperative task communicating with an external source and/or destination through an application programming interface.

In one embodiment, illustrated in FIG. 7, tasks are defined as either "cooperative" tasks 730 or "preemptive" tasks 720. Cooperative tasks are composed exclusively of "cooperative" threads 731, 732 while preemptive tasks are composed exclusively of "preemptive" threads 721, 722. Cooperative tasks 730 and preemptive tasks 720 differ in their ability to provide shared memory pools and other resources 740 to their constituent threads. For example, threads 731 and 732 in a common cooperative task 730 are allowed share a common memory 740. By contrast, threads 721 and 722 in a preemptive task 720 are not permitted to share resources with other threads, including threads in their own task 720. Preemptive threads 721, 722 communicate externally (e.g., with an external message source and/or destination 705) only through message passing (e.g., via an API function call 710).

Figure 8C:
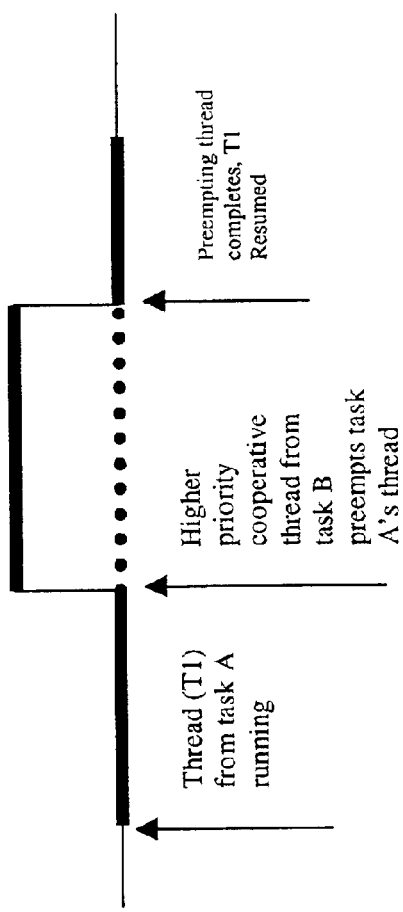

In one embodiment, all threads, both preemptive and cooperative, are individually configured to run at a specified priority level. It is not required that all threads in a task have the same priority (i.e., tasks may be composed of threads of differing priorities). In one embodiment, when a thread is requested, a message for the thread is placed in a priority-sorted FIFO queue (e.g., such as the scheduling queue 215 illustrated in FIG. 2). Normally, if the requested thread is a higher priority thread than the currently-running thread, the running thread is suspended (or "preempted") while the higher priority thread is executed. This operation is illustrated and described in FIGS. 8a through 8c.

Figure 8D:
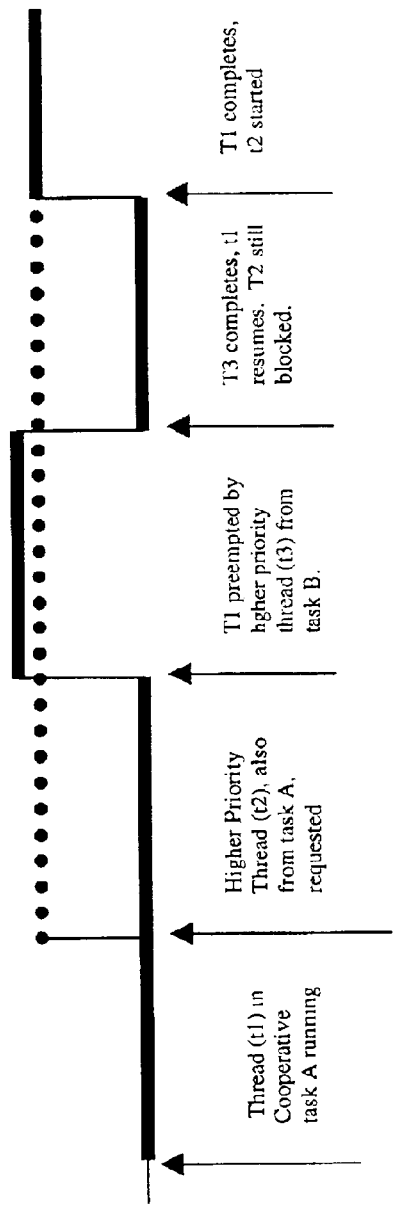

To permit resource sharing within cooperative tasks, an additional condition is placed on cooperative threads: if a cooperative thread is requested while another thread in the same task is running or preempted, the requested thread—regardless of its priority—is "blocked." That is, it is not allowed to run until the running or preempted thread in its task has completed. One example of this blocking function is illustrated and described in FIG. 8d.

In contrast to a cooperative thread, in one embodiment, the execution of a preemptive thread is not constrained by conditions other that its priority relative to other requested threads. Thus, if it is the highest priority requested thread, it is executed immediately.

Figure 9:
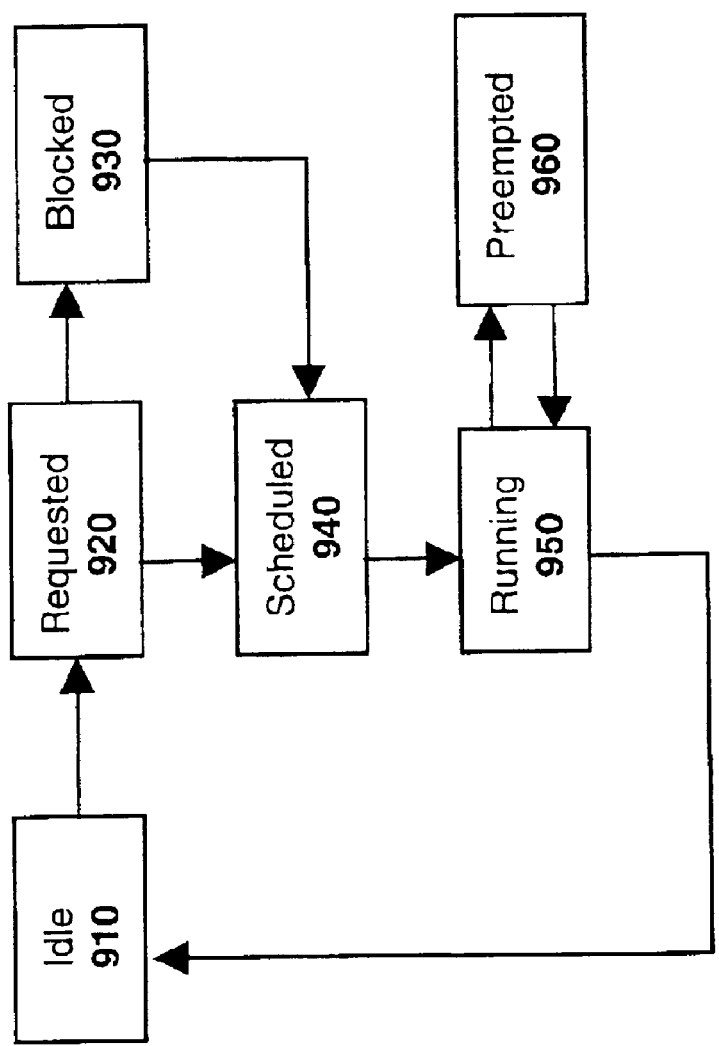
FIG. 9 illustrates various thread states according to one embodiment of the invention.

As illustrated in FIG. 9, in one embodiment, a PTE thread can exist in a variety of different states. In it's idle state 910 a thread is inactive, waiting to be requested. A thread enters the requested state 920 when it receives a message from a running thread or an interrupt service routine ("ISR"). In one embodiment, the thread remains in the requested state until the requester terminates. At that point, the requested thread is either scheduled 940 or enters a "blocked" state 930 (depending on the circumstances as described herein).

As described above, only cooperative threads can enter a blocked state 930; preemptive threads do not block. A cooperative thread is blocked if, after having been requested, a thread from its task is preempted. The thread remains blocked until all preempted threads from its task have resumed and terminated normally. In one embodiment of the PTE, cooperative thread blocking is a built-in mutual exclusion mechanism required for memory sharing between cooperative threads running at different priority levels.

A thread in a scheduled state 940 is queued, waiting for execution. Threads enter the scheduled state 940 after having been requested, after any blocking conditions have been cleared. Once scheduled, the thread cannot again be blocked. The thread will remain in the scheduling queue 940 until it is executed.

When running 950, the thread is performing the function for which it was designed. In one embodiment, only one thread may be running at a time. The thread will execute to completion unless it is preempted. The thread may enter into the preempted state 960 due to another higher priority thread(s) being scheduled (e.g., at the termination of an ISR).

Figure 10:
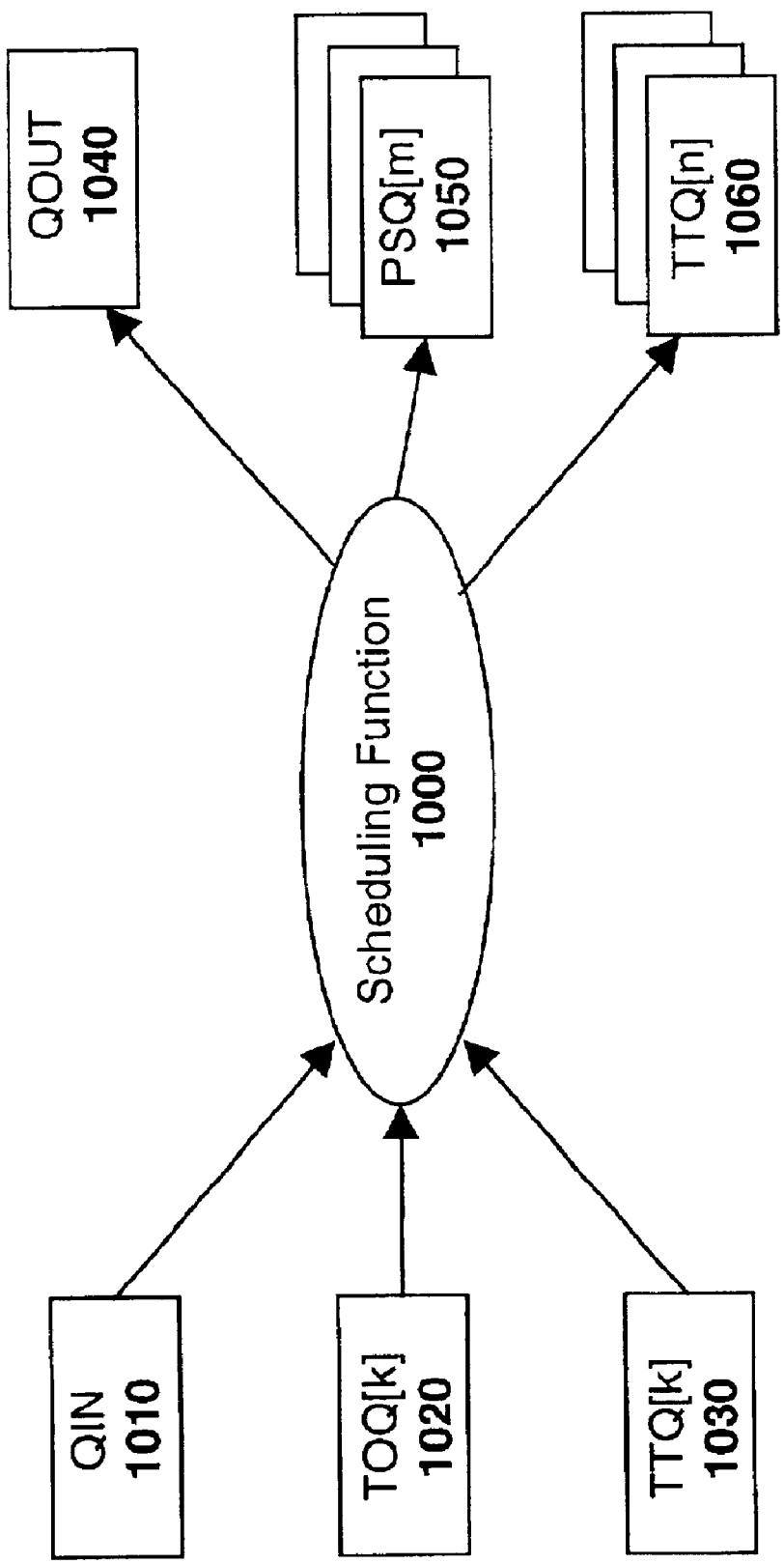
FIG. 10 illustrates a scheduling function according to one embodiment communicating with various system queues.

Referring now to FIG. 10, in one embodiment the scheduler 1000 manages the states of an application's threads and ensures that threads are executed in the proper order by passing message requests through a series of message queues.

The PTE input queue ("QIN") 1010 receives messages read from the external environment (i.e. other PTEs) and ISRs. The scheduler may route messages from QIN 1010 to the temporary task queue ("TTQ") 1060 and/or the priority scheduling queue ("PSQ") 1050.

The PSQ 1050 includes a list of threads ready for immediate execution. The list is sorted based on scheduling variables such as, for example, thread priority and temporal order (i.e., the order in which the threads were requested). As a general rule, in one embodiment, higher priority threads are executed before lower priority threads. For threads with the same priority level, thread requests requested earlier are run before threads requested later.

Requests generated by a thread are stored in a temporary thread output queue ("TOQ") until the thread terminates. This ensures that a thread's output does not cause itself to be inadvertently preempted. In one embodiment, a separate TOQ exists for each priority level. When a thread terminates its TOQ messages are distributed to the TTQ, the PSQ or the PTE output queue ("QOUT").

The TTQ is a holding station for cooperative threads that have been requested but are not ready for scheduling because they are blocked by another active thread in their task group (as described above). This feature is necessary to ensure mutual exclusion between the members of a cooperative task with respect to the task's shared memory. In one embodiment, when the task's active thread terminates, the TTQ is emptied.

The PTE Output Queue ("QOUT") is a temporary holder for all messages leaving the PTE. For example, the QOUT receives messages from the TOQ when a thread completes its execution.

An exemplary method for scheduler operation will now be described with respect to the flowchart in FIG. 11. The scheduler is executed after the normal termination of a thread and at the termination of any ISR and on PTE startup.

When started, the scheduler initially sets the scheduler's priority variable (PRI) to the maximum priority level supported by the PTE. The scheduler (1110) reads any messages waiting for the PTE from external message sources (i.e.

other possible PTEs) and copies (1111) these messages to the tail end of the PTE's input queue (QIN) in the order received. All messages (1115) in the PTE input queue (QIN) are then moved by the message routing function (1116) to either the Priority Scheduling Queue (PSQ) or to the Temporary Thread Queue (TTQ).

Next, the scheduler evaluates the entry in the Preempted Task Table (PTT) corresponding to the current value of PRI (the scheduler's priority variable). If the PTT entry indicates that the priority level in "in use", the scheduler exits immediately (1126) and resumes a preempted thread at the point where interrupted by an ISR.

If, instead, the PTT indicates that no task in running at the priority level corresponding to PRI's value, the scheduler examines the PSQ for any messages to threads with priority assignments equal to the scheduler's priority variable's value (1130). If none are found, PRI is decremented by one (1135) and if greater than zero (1120), the PTT (1125) is again examined for evidence of a preempted thread at a now lower thread priority level. The loop between 1120 to 1135 continues, thusly, until PRI is decremented to a negative value, in which case the scheduler exits (1121); PRI is decremented to the priority level of a previously preempted thread (1126), in which case the preempted thread is resumed (1126); or a message is found in the PSQ to a thread with a priority level equal to the value of PRI.

If examination of the PSQ (1130) finds a message waiting for a thread with a priority level equal to that of PRI, scheduler alters the PTT's values to indicate that the priority level of corresponding to PRI is "in use". The scheduler then extracts the message from the PSQ, starts the thread to which it is addressed (1131) and delivers the message to that thread.

When the thread ends, the scheduler routes each message (1140) created by the thread (found in the Thread Output Queue (TTQ) corresponding to the thread's priority level) to an appropriate message queues (PSQ, TTQ, or QOUT) as determined by the message router (1141). The TTQ is then scanned (1150) and messages therein are redistributed as determined by the message router (1151). Finally, each message (1160) in the output queue (QOUT) is distributed to an external PTE address by the PTE write function (1161) and the scheduler exits (1162).

Message Routing

Figure 11:
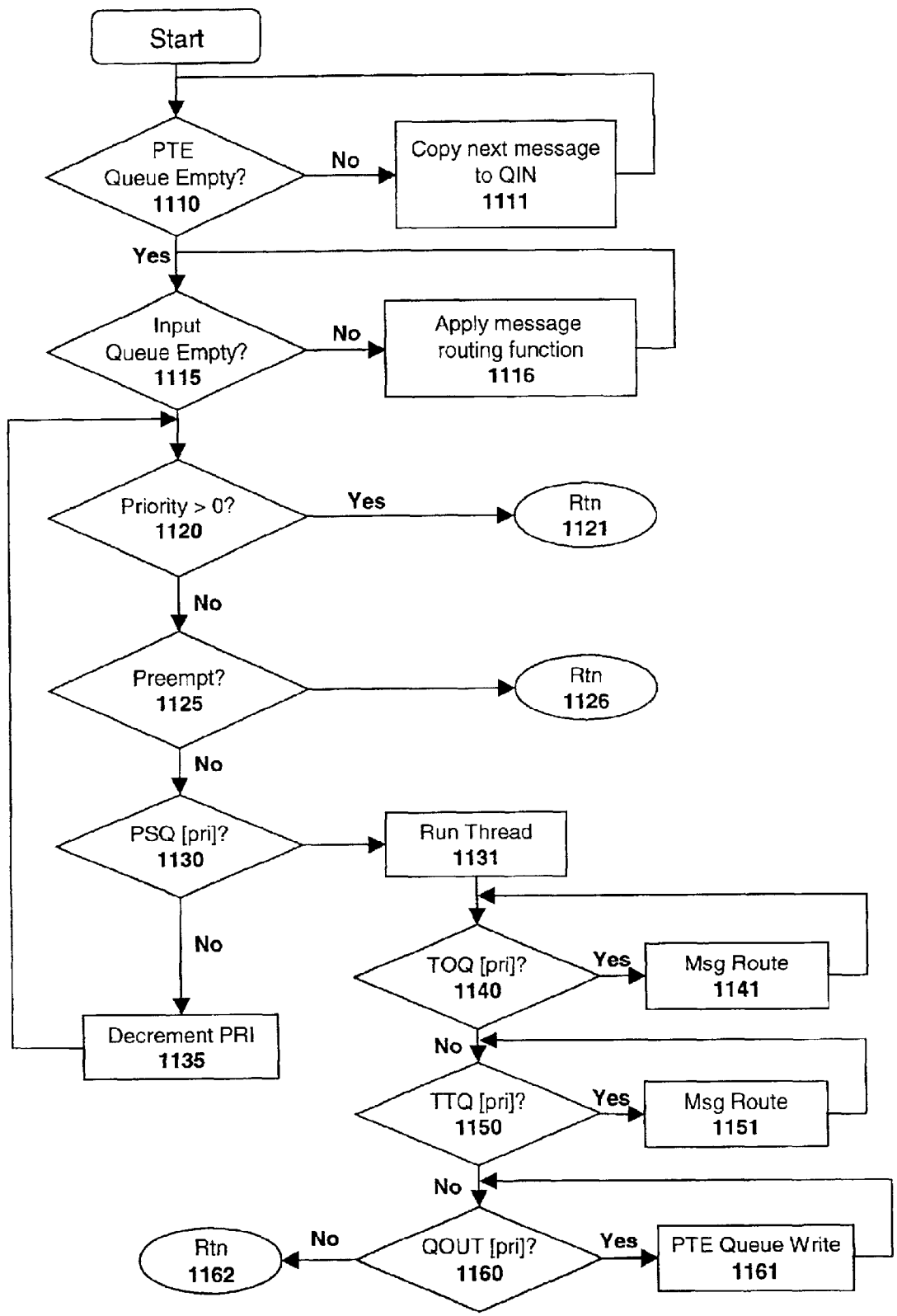
FIG. 11 illustrates scheduler operation according to one embodiment of the invention.

In one embodiment, a routing function is implemented to route thread requests throughout the PTE (e.g., at each of the decision blocks of FIG. 11). Thus, the scheduler, in a critical section, may invoke the message routing function to move messages between the PTE's various message queues. The routing function in one embodiment uses the message's thread name as a destination address for the message (in this embodiment, each message contains a header with a thread name identifying its destination).

The ultimate goal of the routing mechanism is to transfer a message from its source to a PSQ, and then to dispatch the message from the PSQ to the message's destination thread (e.g., specified by its thread name). To achieve this goal the router may pass the message through a series of intermediate queues (as described above).

Figure 12:
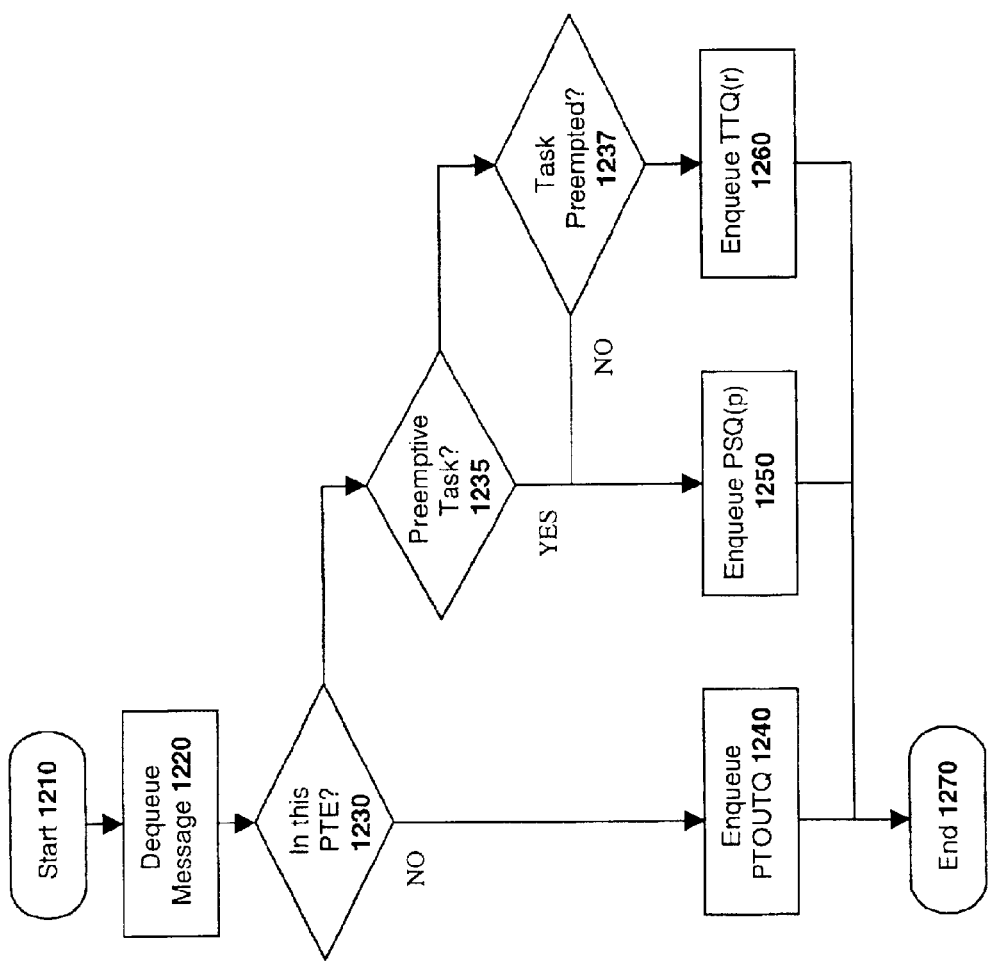
FIG. 12 illustrates message routing logic according to one embodiment of the invention.

One embodiment of a routing method is illustrated in FIG. 12. At 1220 the router de-queues the message from its source. Then, at 1230, the router determines whether the message is directed to an internal PTE thread or an external thread (i.e., located in a different PTE). If the destination is an external thread, then the router transfers the message to an output queue (at 1240) and the routing process is complete with respect to that message (i.e., the other PTE takes over the routing function after receiving the message from the output queue).

If, however, the message is for an internal thread, the router then determines whether the task is a preemptive task (at 1235). If the message is for a preemptive task, it transmits the message directly to the PSQ (at 1250) at a specified priority level. If the message is for a cooperative task, then at 1237 the router determines whether any other thread from the thread's task is preempted. If no other thread from the thread's task is preempted, the router transmits the message to the PSQ at a specified priority level (e.g., specified by the thread name as described below). If another thread from the thread's task is preempted, however, the router queues the message in the TTQ at the thread's specified priority level.

In one embodiment, the router uses three tables to look up information about its tasks and/or threads. As illustrated in FIGS. 13a, 13b and 13c, these include a thread attribute table ("TAT"), a task status table ("TST"), and/or a preempted thread table ("PTT"), respectively.

In one embodiment, each thread in the PTE environment is uniquely identified by a thread "name." Thread names may be used by the router to identify information such as, for example, a message's destination thread. In addition, as illustrated in FIG. 13a, the thread name (e.g., "Thread[n]" in FIG. 13a) may be used to identify other information such as the thread's PTE, Task ID, Thread ID, Thread Priority, and Task Type.

The task ID identifies the task to which the thread belongs. The task may be internal (i.e., within the local PTE) or external. If internal, messages sent to the task are delivered though internal message queues (as described above). If external, messages are routed to the common output queue ("QOUT").

The thread ID identifies a specific thread within a task; the thread priority defines the thread's execution priority in relation to other threads (various priority levels may be implemented consistent with the underlying principles of the invention); and the task type identifies the thread's task as either preemptive or cooperative. It should be noted that although only one thread name entry is shown in FIG. 13a, the underlying principles of the invention may be implemented using TAT's with a variety of different thread name entries.

As indicated in FIG. 13b, in one embodiment, a task status table ("TST") records the priority of each task's highest priority started thread (in this context, "started" can mean running, preempted, or interrupted). If no thread within the task is running, the TST records that the task is idle. In one embodiment, the scheduler uses the TST entries to route messages directed to started cooperative threads to the proper TTQ.

In addition to the TST, the PTE keeps a table, referred to as a preempted thread table ("PTT"), that records the priority levels which are currently in use.

Wireless Implementations

Figure 14:
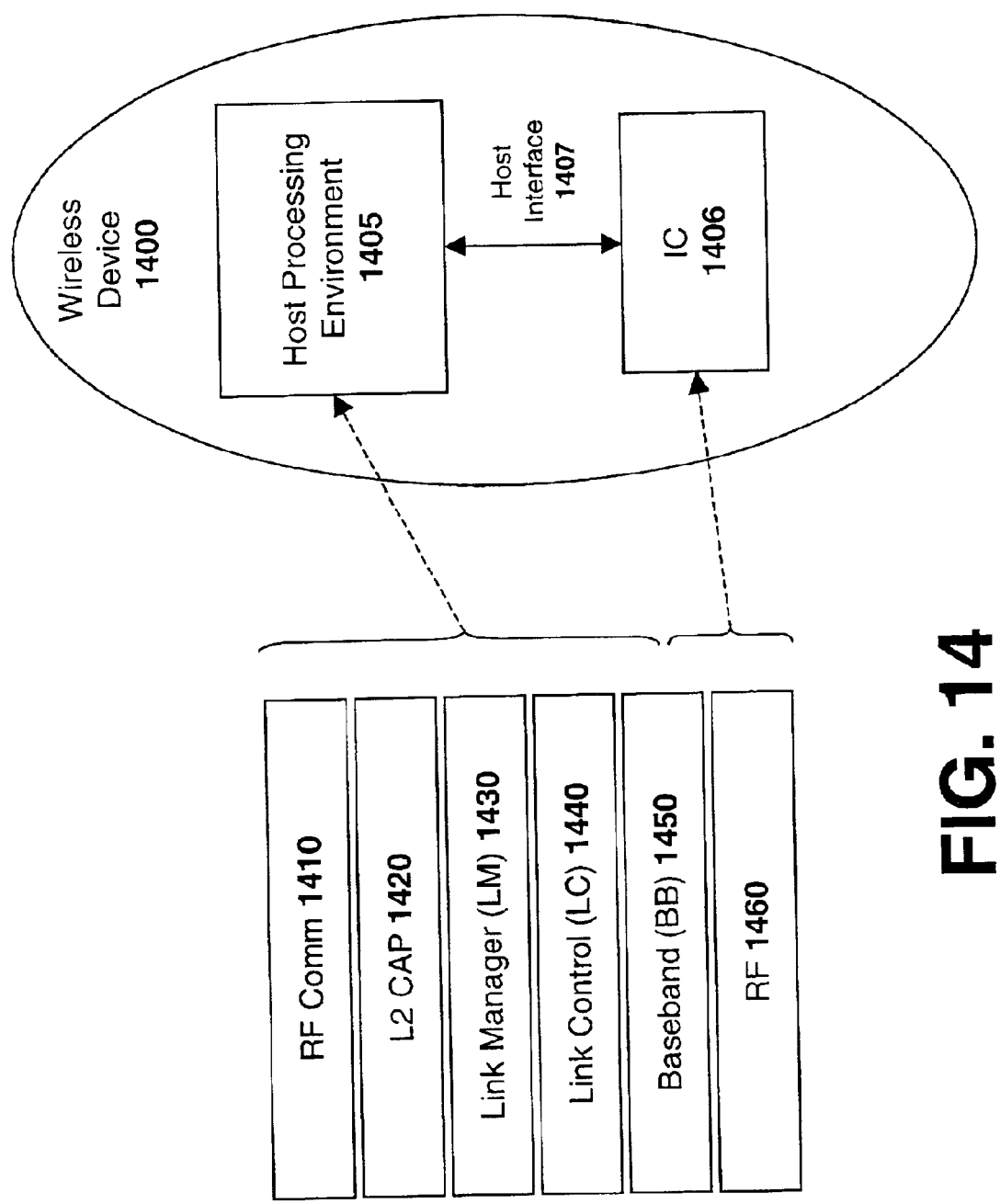
FIG. 14 illustrates a wireless protocol stack implemented using one embodiment of the invention.

In one embodiment, the PTE described herein is used to support a communications protocol stack. For example, if the system is configured to support the Bluetooth protocol, the protocol stack may be divided as illustrated in FIG. 14, with the RF layer 1460 and portions of the baseband layer 1450 programmed in a Bluetooth IC 1406 (which may be an ASIC) and the remaining layers, including certain portions of the baseband layer 1450, implemented as software executed in the host processor environment 1405. In this embodiment, tasks and threads may reside in both the Bluetooth IC 1406 and the host processing environment 1405. Each layer in the protocol stack is implemented as a separate task. Messages transmitted between tasks in the hardware portion and tasks in the software portion will occur over the host interface 1407.

In an alternate implementation of the same protocol stack, some stack layers, RFCOMM (1410) and L2CAP (1420) for example, might be executed in a second host processing environment. A PTE would be implemented in each host environment sharing a common inter-processor messaging mechanism. Within the PTE Application Interface (330) as shown in FIG. 3, protocol layers (RFCOMM and L2CAP in this case) can be moved from one host environment to the other without altering the software that implements the layer functions.

As described above, the PTE is ideal for this type of wireless communication environment because it can easily be ported from one host processing environment to another without significant modification. As previously described, applications run within a PTE are composed of tasks (groups of threads) threads which interact with the PTE through a limited number of fixed API calls. Because the API calls are invariant for all PTE instances, a Task created for one PTE can be run on any other PTE without modification, regardless of the host environment. All differences in host environments are accounted for in the Host Adaptation Layer illustrated in FIGS. 3 and 4. It is typically be necessary to change only the Host Adaptation Layer when the PTE's host is changed. The PTE's simple common communication system for messaging and synchronization enable the PTE to be implemented with very little software in most operating environments. Being relatively small (and typically a small fraction of the size of the application code it supports), the PTE can be adapted to a new host, and be proven to be operating correctly with relatively little effort. No other changes are necessary. It is important to note that the apparatus and method described herein may be implemented in environments other than a physical integrated circuit ("IC"). For example, the circuitry may be incorporated into a format or machine-readable medium for use within a software tool for designing a semiconductor IC. Examples of such formats and/or media include computer readable media having a VHSIC Hardware Description Language ("VHDL") description, a Register Transfer Level ("RTL") netlist, and/or a GDSII description with suitable information corresponding to the described apparatus and method.

Throughout the foregoing description, for the purpose of explanation, numerous specific details were set forth in order to provide a thorough understanding of the invention. It will be apparent, however, to one skilled in the art that the invention may be practiced without some of these specific details. For example, while the embodiments described above focused on the Bluetooth protocol, many of the underlying principles of the invention may practiced using various other types of wireless and terrestrial protocols. Accordingly, the scope and spirit of the invention should be judged in terms of the claims which follow.

What is claimed is:

1. A portable thread environment for supporting the execution of application program tasks, the portable thread environment comprising at least one of logic encoded in media and a processing element and the portable thread environment comprising:

an application programming interface configured to support multiple application program tasks with each task comprised of one or more threads;

host adaptation logic operable to communicate information between one or more of said threads and a host processing environment;

a scheduler configured to determine an execution order of said one or more threads based on one or more execution variables;

message passing logic configured in said application programming interface to communicate information in messages transmitted between a first thread that is a member of a first task and a second thread that is a member of a second task; and a memory element operable to store information received from the first thread and to permit a third thread to access the stored information if the third thread is a member of the first task.

2. The portable thread environment as in claim 1 wherein one of said execution variables is a thread's priority level.

3. The portable thread environment as in claim 3 wherein another of said execution variables is a point in time when said thread was requested relative to other threads.

4. The portable thread environment as in claim 1 wherein said first task and said second task are each from a different application program.

5. A method for porting an application from a first host environment to a second host environment, said second host environment having application-specific hardware that supports a first set of functions, the method comprising:

loading said application into said first host environment, said application comprising a first set of tasks, wherein said first set of tasks are operable to perform a first set of functions when executed and wherein each task comprises one or more program fragments;

removing said first set of tasks from said application; and loading said application without said first set tasks into said second host environment, said application-specific hardware operable to perform said functions performed by said first set of tasks in said first host environment.

6. The method as in claim 5 wherein said application further comprises a second set of tasks, wherein said second set of tasks are operable to perform a second set of functions that are not supported by said application-specific hardware, and wherein loading said application into said second host environment comprises loading said application with said second set of tasks and without said first set of tasks into said second host environment.

7. The method as in claim 6 further comprising:

configuring said first set of tasks and said second set of tasks to communicate by passing a set of messages in said first host environment, wherein one or more of said set of messages are also used to provide communication between said first set of tasks and said application-specific hardware in said second host environment.

8. A portable thread environment for supporting the execution of application program tasks, the portable thread environment comprising at least one of logic encoded in media and a processing element and the portable thread environment comprising:

a first group of tasks providing a first group of functions within said portable application environment;

a second group of tasks providing a second group of functions within said portable application environment;

wherein said first group of tasks is removeable from said portable application environment when said portable application environment is loaded on a host having application-specific hardware that is operable to provide said first group of functions.

9. The portable thread environment as in claim 8 wherein said first set of tasks and said second set of tasks communicate by passing messages in said first host environment, wherein one or more of the same messages also provide communication between said first set of tasks and said application-specific hardware in said second host environment.

10. The portable application environment as in claim 8 wherein each task is comprised of one or more threads.

11. The portable application environment as in claim 10 wherein said threads communicate to other threads and tasks by passing messages.

12. The portable application environment as in claim 8 wherein said application-specific hardware is an application-specific integrated circuit ("ASIC").

13. The portable application environment as in claim 9 further comprising:
   scheduling logic for scheduling transmission of said messages between said tasks and between said tasks and said application-specific hardware.

14. The portable application environment as in claim 13 further comprising:
   one or more queues for temporarily storing messages before they are delivered.

15. The portable application environment as in claim 14 wherein said queues include:
   a priority queue for storing a list of threads scheduled by said scheduling logic for immediate execution.

16. The portable application environment as in claim 15 wherein said scheduling logic schedules threads for execution in said priority queue based on priority of said threads and/or temporal order in which said threads were received.

17. A portable thread environment for supporting the execution of application program tasks, the portable thread environment comprising at least one of logic encoded in media and a processing element and the portable thread environment comprising:
   application programming interface means to support multiple application program tasks with each task comprised of one or more threads;
   host adaptation means operable to communicate information between one or more of said threads and a host processing environment;
   scheduler means configured to determine an execution order of said one or more threads based on one or more execution variables;
   message passing means configured in said application programming interface means to communicate information in messages transmitted between a first thread that is a member of a first task and a second thread that is a member of a second task; and
   storage means operable to store information received from the first thread and to permit a third thread to access the stored information if the third thread is a member of the first task.

18. The portable thread environment as in claim 17 wherein one of said execution variables is a thread's priority level.

19. The portable thread environment as in claim 18 wherein another of said execution variables is a point in time when said thread was requested relative to other threads.

20. The portable thread environment as in claim 17 wherein said first task and said second task are each from a different application program.

21. The portable thread environment as in claim 17 further comprising:
   queuing means configured to store messages transmitted between said one or more threads.

* * * * *